Nov. 23, 1926.
H. R. SHEKERJIAN
BICYCLE
Filed July 10, 1926
1,608,141
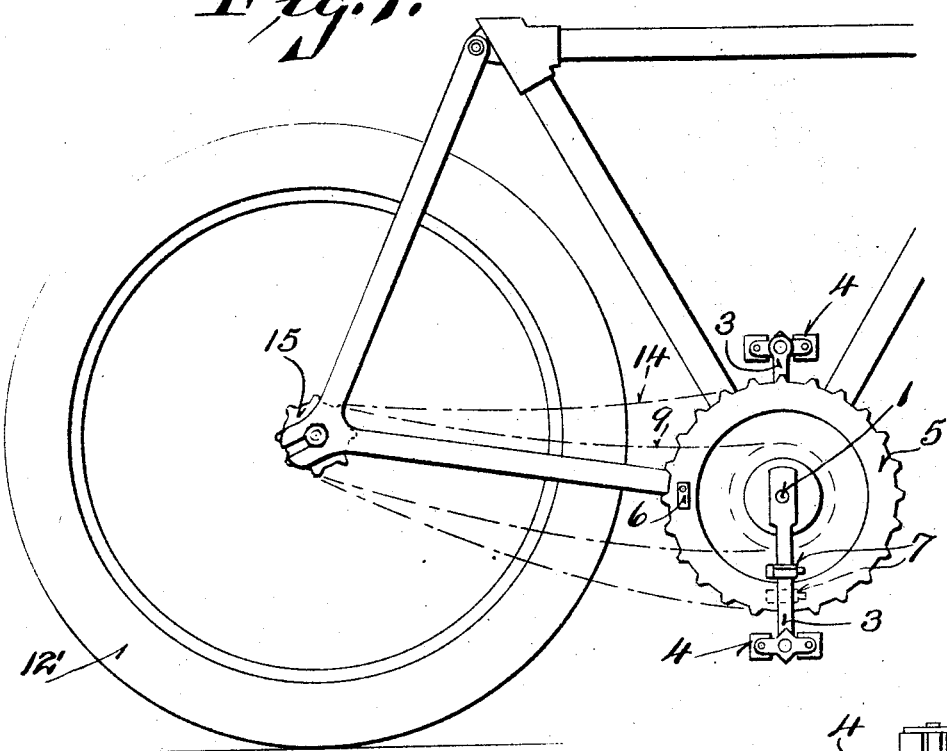
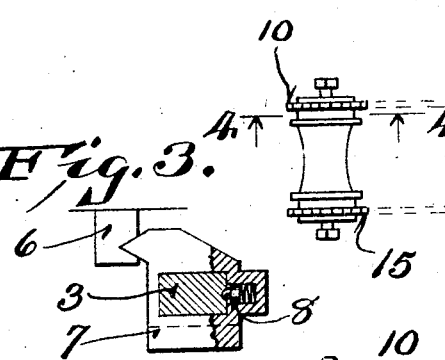
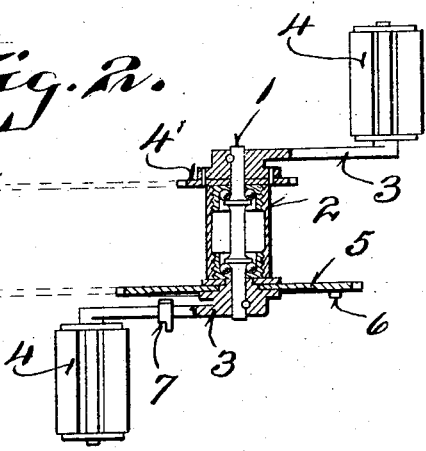
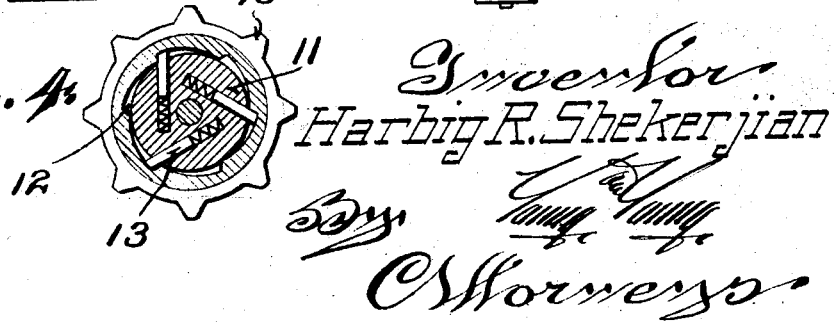
Inventor
Harbig R. Shekerjian Patented Nov. 23, 1926.

1,608,141

UNITED STATES PATENT OFFICE.

HARBIG R. SHEKERJIAN, OF MORRISTOWN, NEW JERSEY.

BICYCLE.

Application filed July 10, 1926. Serial No. 121,551.

This invention relates to bicycles, and is particularly directed to the drive for a bicycle.

Objects of this invention are to provide a two speed chain drive for a bicycle which is of extremely rugged and serviceable construction, which is eminently practical and may be easily applied to bicycles, and which permits the operator to drive either with a low gear or a high gear ratio, thus making it possible to utilize the most advantageous ratio for the particular grade or road upon which he is traveling.

An embodiment of the invention is shown in the accompanying drawings in which:

Figure 1 is a side elevation of the rear portion of a bicycle equipped with the drive;

Figure 2 is a fragmentary view partly in section, showing details of the drive;

Figure 3 is a view showing the detachable locking means;

Figure 4 is a sectional view on the line 4—4 of Figure 2.

Referring to the drawings, it will be seen that the bicycle is constructed as usual throughout its major portion. However, the drive for the rear wheel consists of the pedal shaft 1, which is journaled in the bearings 2 and provided with arms 3 equipped with pedals 4. This shaft rigidly carries a sprocket wheel 4¹ which is rigidly locked thereto, preferably by pinning to the hub of one of the crank arms 3, as shown in Figure 2. The other end of the shaft, although rigidly connected to the arm 3 on that side of the shaft, loosely carries a relatively large sprocket wheel 5, which is normally free to turn with reference to the shaft. This sprocket wheel carries a projecting member 6, preferably equipped with a socket. The arm 3 adjacent the sprocket wheel 5 is provided with a sliding stop 7, as shown most clearly in Figure 3. This stop is adapted to engage the stop 6 to lock the arm 3 temporarily to the large sprocket wheel 5. It is preferable to provide the stop 7 with a spring pressed plunger 8 which is adapted to snap into recesses formed in the arm 3, as shown in section in Figure 3, to thus lock the movable stop 7 in either its detached or attached position.

The sprocket wheel 4 is connected by means of a chain 9 with a sprocket wheel 10 operatively coupled to the hub 11 of the rear wheel 12. This sprocket wheel 10 is connected to the hub by an overrunning clutch or coaster clutch, such, for instance, as shown in Figure 4. For instance, as shown in Figure 4, the sprocket wheel 10 may have a shell-like hub overhanging a portion of the hub 11 and provided with notches, as indicated at 12. These notches may receive the spring pressed plungers 13 and thus permit a locking drive when the sprocket wheel 10 actually drives the rear wheel of the bicycle, and yet permit an overrunning action to occur when the rear wheel travels at a greater rate than that imparted by the sprocket wheel 10.

The sprocket wheel 5 is connected by means of a chain 14 with a sprocket wheel 15. This sprocket wheel 15 may also be connected to the hub 11 by an overrunning clutch, if desired, but it has been found that the sprocket wheel 15 may be rigidly mounted upon the hub.

In operation, when the rider is climbing a hill, he uses the low gear ratio and drives from the sprocket wheel 4 to the sprocket wheel 10. However, when he is riding upon a level road and desires a greater speed, he connects the slidable stop 7 with the stop 6 fixedly mounted on the large sprocket wheel 5 directly to the crank or pedal. This sprocket wheel drives the small sprocket wheel 15, and thus the necessary speed is secured. The hub 11 due to the overrunning clutch connection with the sprocket wheel 10 freely rotates at a higher rate than that of the sprocket wheel 10.

It is to be noted that when the stop 7 is out of engagement with the stop 6 that the sprocket wheel 5 may freely slip with reference to the pedal shaft 1.

It will be seen that the mechanism is very simple and may be easily operated. For example, the operator may, if desired, manipulate the stop member 7 by sliding it in or out with his foot while the bicycle is in motion to effect the change desired.

It is noted further that the device may be relatively cheaply produced and easily applied to bicycles.

Although the invention has been described in considerable detail, such description is intended as illustrative rather than limiting as the invention may be varously embodied and as the scope of such invention is to be determined as claimed.

I claim:

In a bicycle, the combination of a rear driving wheel having a hub, a sprocket wheel carried at one side of said hub, a second sprocket wheel carried at the other side of said hub and having an overrunning clutch connection therewith, a pedal shaft provided with pedal arms rigid therewith, a driving sprocket wheel rigid with said shaft and connected by means of a chain with said overrunning sprocket wheel, a relatively large sprocket wheel loosely mounted upon said pedal shaft and connected by means of a chain to the other hub sprocket wheels, said relatively large sprocket wheel having a stop fixed thereon, and the corresponding pedal arm having a movable stop adapted to be moved into engagement with said first mentioned stop, whereby said relatively large sprocket wheel may be operatively connected to said pedal shaft.

In testimony that I claim the foregoing I have hereunto set my hand at Morristown, in the county of Morris and State of New Jersey.

HARBIG R. SHEKERJIAN.